Aug. 15, 1950
F. W. COFFING
2,519,023
THREADED KEY LOCK STRUCTURE
Filed Jan. 7, 1949
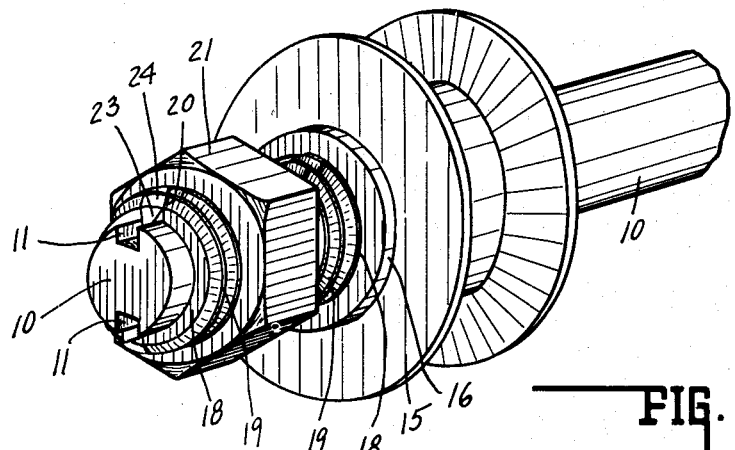
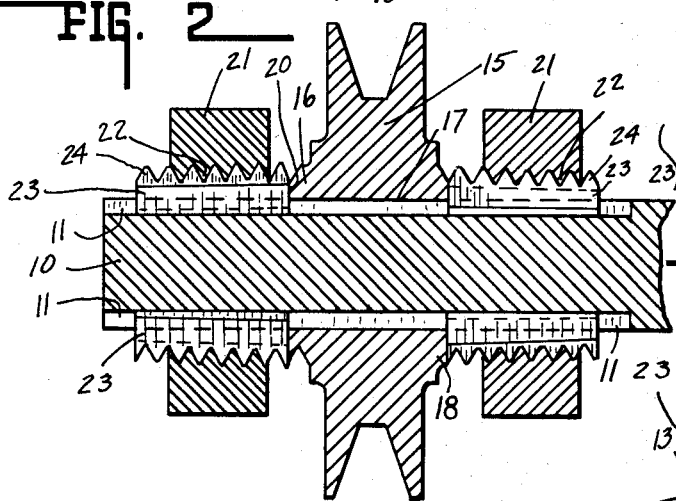
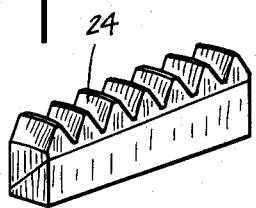
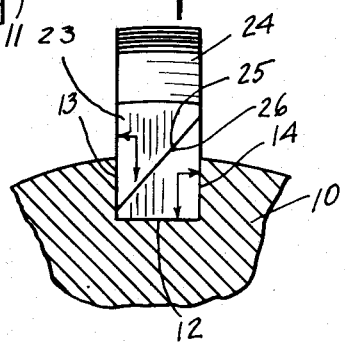
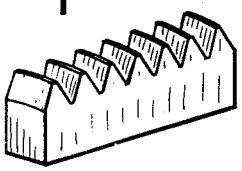
INVENTOR.
FREDRICK W. COFFING.
BY
Lockwood, Goldsmith & Galt
ATTORNEYS.

Patented Aug. 15, 1950

2,519,023

UNITED STATES PATENT OFFICE 2,519,023

THREADED KEYLOCK STRUCTURE

Fredrick W. Coffing, Danville, Ill., assignor to Coffing Hoist Company, Danville, Ill., a corporation Application January 7, 1949, Serial No. 69,795

4 Claims. (Cl. 287—52.07)

This invention relates to a threaded key locked structure.

The chief object of this invention is to provide a key for locking a sleeve to a shaft by a nut threaded on the sleeve which nut also has threaded association with threads upon the key.

One chief feature resides in threading a portion of the key and slotting a threaded sleeve to expose the key threads for nut engagement.

A second chief feature resides in tapering the threaded surface of the key for wedge locking of the nut in an axial tightening direction.

A third chief feature of the present invention resides in the taper threaded key being, in many instances, a solid single element.

A fourth chief feature of the invention resides in diagonally dividing the key whereby radial and chordal wedging between key and the sleeves and the shaft is effected in nut tightening.

Herein for simplicity an external key connection structure is illustrated and described but the basic invention is readily applicable to an internal key connection using a threaded bolt for tightening.

Herein the term threaded means comprehends a nut or a bolt, and concentric members having registering key seats one of which is a radial slot open at both ends comprehends the sleeve and axle or an enveloping member upon an internally threaded member. Obviously threaded key means comprehends respectively an externally threaded key surface or an internal threaded key surface for nut or bolt thread connection respectively.

Other objects and features of the invention will be set forth more fully hereinafter.

The full nature of the invention will be understood from the accompanying drawings and the following description and claims:

In the drawings—

Fig. 1 is a perspective view of an external embodiment of the invention exemplified in a shaft and pulley assembly.

Fig. 2 is a longitudinal section through same.

Fig. 3 is a perspective view of a tapered threaded key utilized in such embodiment.

Fig. 4 is an enlarged transverse sectional view through the shaft with the key shown in end elevation.

Fig. 5 is a perspective view of the solid or single taper threaded key form of the invention.

In the drawings 10 indicates a shaft having one or more longitudinally disposed elongated keyways 11 formed therein. In cross section same are rectangular having root wall 12 and side walls 13 and 14, see Fig. 4.

An element such as a pulley 15, see Fig. 1 includes a hub portion 16 centrally apertured as at 17, see Fig. 2, to mount the same upon said shaft 10. The pulley includes a sleeve extension 18 which is externally threaded as at 19. It also is slotted at 20 and the slots are disposed to register with seats or keyways 11 as shown in Fig. 1.

A nut 21, internally threaded as at 22, is threadable upon said sleeve, see Figs. 1 and 2, wherever the sleeve and pulley is disposed upon said shaft 10. Disposed in each pair of registering slots and keyways, see Fig. 2 is a key structure 23, shown most clearly in Fig. 3.

This key structure has its outer face threaded as at 24, and the same is tapered slightly, see Figs. 2, 3 and 4. Now when the keys are seated in the keyways and the slots, the threads 24 are exposed and when registered with threads on the sleeve and the nut is applied and tightened this will bear down on the threaded key and on account of the taper in the key will bear down on the key in the shaft and will lock the pulley, gear, etc. upon said shaft in any position desired. This is any position within the range of the length of the keyways 11.

The taper formation of the keys insures wedge locking between the sleeve and shaft and wedge locking between the keys and nut so that all elements are thus locked in the desired axially adjusted position.

To increase the effectiveness of this invention and its adjustability, should there be slight dimensional differences, each key structure comprises a plurality of relatively slipping parts. Herein two are shown. For a right hand thread it has been found that the key might be split diagonally from the lower left hand corner to the upper right hand corner. For a left hand thread the split would be reversed.

Such a right hand thread split key is shown most clearly in Figs. 3 and 4 and the split opposing faces are designated by numerals 25 and 26.

With parts registered, if the keyway 11 be slightly over size when the nut is tightened, it causes relative slippage between faces 25 and 26 so that in effect the key operatively adjusts its width to the width of the keyway. Arrows in Fig. 4 designate force dispositions.

The key bears either through the threaded diagonal key portion upon both shaft and sleeve or through the non-threaded diagonal key portion upon both shaft and sleeve depending upon which direction the shaft rotates.

In actual production the shaft key seat or seats are cut in the shaft in the usual manner. The slots in the hub or sleeve of pulley, gear or the like may be cut by a miller. The present invention eliminates the necessity for using a thrust bearing. It also eliminates the need for locking pins through the shaft. The nut prevents the end of the slotted sleeve from spreading.

Fig. 2 illustrates a double application of the invention, the pulley having oppositely extending sleeves 18 and the shaft having elongated grooves 11.

In Fig. 5 there is illustrated a non-split taper threaded solid key embodiment which can be used in most instances instead of the bias split keys.

Adjustment upon the shaft requires only loosening of the nut and adjusting all movable parts upon the shaft and their retightening of the nut. If the keys stick in the keyways after nut is removed, the keys then are readily removed by knocking same loose with a punch.

Some of the fields of application are the keying to the power shafts of gasoline and electric motors, pulleys, universal joints, gears, sprockets or the like, also for water pumps, propeller shafts in boats, all kind of farm machinery including the power take-off shaft of the tractor where fluid or air pumps are attached to the spline shaft. The power take-off shaft need only be provided with a keyway or ways and same may be readily formed therein in any machine shop.

The present invention thus maintains the shaft in excellent condition at all times for the interchangeable reception and removal of accessories without marring etc. said shaft which is the present unavoidable practice in the field.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. In a rotative connection between an axle member and a second member to be supported thereby and for rotation as a unit, the combination therewith of a sleeve portion upon one member and axially projecting therefrom, the other member and the sleeve portion having concentric association, the sleeve portion having a key seating elongated slot therethrough, the said other member having a slot registering key seating groove, the sleeve portion opposite the other member associated surface having a threaded surface interrupted by the slot, a key structure simultaneously seated in the groove and slot and having a threaded face exposed by the sleeve slot adjacent the sleeve thread surface, the key structure having a taper formation, and a threaded locking member such as a nut or bolt for simultaneous engagement with the sleeve and key threads to lock the two first mentioned members together in axially adjusted position.

2. A connection as defined by claim 1 wherein the sleeve portion is externally threaded and the locking member comprises a nut.

3. A connection as defined by claim 1 wherein the sleeve portion includes a plurality of spaced parallel slots and the other member includes at least a like number of similarly spaced key seating grooves, and there is provided a like number of tapered and threaded key structures, the threaded locking member having simultaneous threaded association with the sleeve portion and all key structures.

4. A connection as defined by claim 1 wherein each key structure is of multi-part character, the parts thereof having biased facial association.

FREDRICK W. COFFING.

REFERENCES CITED

The following references are of record in the file of this patent:

UNITED STATES PATENTS

| Number | Name | Date |
|---|---|---|
| 112,551 | Cole | Mar. 14, 1871 |
| 688,687 | Printz | Dec. 10, 1901 |
| 1,674,889 | Craig | June 26, 1928 |
| 2,401,536 | Williams | June 4, 1946 |